United States Patent
Sundaram et al.

(10) Patent No.: US 9,478,973 B2
(45) Date of Patent: Oct. 25, 2016

(54) METHOD FOR TRANSFER OF CONTROL BETWEEN DEVICES IN A SUBSTATION SYSTEM AND A DEVICE THEREOF

(71) Applicant: ABB RESEARCH LTD, Zürich (CH)

(72) Inventors: Senthil Kumar Sundaram, Bangalore (IN); Sasi Kumar, Vengipalayam (IN); Vivek Gopalakrishnan, Vellore (IN); Wolfgang Wimmer, Rietheim (CH)

(73) Assignee: ABB Schweiz AG, Baden (CH)

( * ) Notice: Subject to any disclaimer, the term of this patent is extended or adjusted under 35 U.S.C. 154(b) by 690 days.

(21) Appl. No.: 13/632,528

(22) Filed: Oct. 1, 2012

(65) Prior Publication Data

US 2013/0031164 A1    Jan. 31, 2013

Related U.S. Application Data

(63) Continuation of application No. PCT/IB2010/001555, filed on Jun. 28, 2010.

(30) Foreign Application Priority Data

Mar. 31, 2010    (IN) .............................. 898/CHE/2010

(51) Int. Cl.
| | |
|---|---|
| *G06F 15/16* | (2006.01) |
| *H02H 7/26* | (2006.01) |
| *G06F 15/173* | (2006.01) |
| *G06F 11/00* | (2006.01) |
| *G05D 3/12* | (2006.01) |
| *H02H 1/00* | (2006.01) |
| *H02H 3/05* | (2006.01) |

(52) U.S. Cl.
CPC ............ *H02H 7/261* (2013.01); *H02H 1/0061* (2013.01); *H02H 3/05* (2013.01); *Y02E 60/723* (2013.01); *Y04S 10/16* (2013.01)

(58) Field of Classification Search
CPC .... H02H 7/261; H04L 12/2602; H04L 12/42
USPC .......... 709/203, 223; 370/217, 219; 700/292
See application file for complete search history.

(56) References Cited

U.S. PATENT DOCUMENTS

| | | | | |
|---|---|---|---|---|
| 8,565,070 | B2* | 10/2013 | Harper | ................ H04L 12/2602 370/216 |
| 2006/0059253 | A1* | 3/2006 | Goodman | .............. G06Q 10/10 709/223 |
| 2008/0025208 | A1* | 1/2008 | Chan | ........................ H04L 12/42 370/217 |
| 2008/0244044 | A1 | 10/2008 | Wimmer | |
| 2011/0112699 | A1* | 5/2011 | Tournier | ................ H02H 7/261 700/292 |

FOREIGN PATENT DOCUMENTS

| | | |
|---|---|---|
| EP | 1 976 177 A1 | 10/2008 |
| EP | 2 159 893 A1 | 3/2010 |
| WO | WO 2008/040263 A1 | 4/2008 |
| WO | WO 2009/062535 A | 5/2009 |

OTHER PUBLICATIONS

International Search Report (PCT/ISA/210) issued on Jan. 25, 2011, by the Indian Patent Office as the International Searching Authority for International Application No. PCT/IB2010/001555.

* cited by examiner

*Primary Examiner* — David Lazaro
*Assistant Examiner* — Vitali Korobov
(74) *Attorney, Agent, or Firm* — Barnes & Thornburg LLP (57) ABSTRACT

An exemplary method and system are disclosed for coordinated transfer of control in a substation system having IED or logical devices/servers using GOOSE messages with preconfigured data models with logical nodes containing one or more data objects including private data objects (DO) connected in the substation communication network. The method for transfer of control can be illustrated for hot-standby device management and for other applications such as logical isolation of merging unit in a substation and load sharing between IEDs. The method can be used for devices that do not have MMS stack.

18 Claims, 4 Drawing Sheets

METHOD FOR TRANSFER OF CONTROL BETWEEN DEVICES IN A SUBSTATION SYSTEM AND A DEVICE THEREOF

RELATED APPLICATION

This application claims priority as a continuation application under 35 U.S.C. §120 to PCT/IB2010/001555, which was filed as an International Application on Jun. 28, 2010 designating the U.S., and which claims priority to Indian Application 898/CHE/2010 filed in India on Mar. 31, 2010. The entire contents of these applications are hereby incorporated by reference in their entireties.

FIELD

The present disclosure relates generally to the field of substation automation, such as configuration and operation of intelligent electronic devices deployed in the substations.

BACKGROUND

An electrical or power substation involves electricity transmission and distribution systems where voltage is transformed from high to low or the reverse using transformers. Electric power may flow through several substations between generating plant and consumer, and in the process be transformed through many voltage levels in several steps.

Appropriate equipments are selected for these functions depending on whether the substation is a transmission, sub-transmission or distribution substation. These equipments could include transformers, reactors, capacitor banks, circuit breakers, disconnector switches etcetera. Substation Automation can involve protection, control, monitoring and metering functions of the above mentioned equipment and derives reliable information for efficient functioning of the substation. Currently different types of Intelligent Electronic Devices (IEDs) are used in a Substation Automation (SA) system to cater to protection, control, monitoring and metering functions of different substation equipment. The IEDs are microprocessor-based controllers of power system equipment, such as circuit breakers, transformers, and capacitor banks. For example, the IEDs receive data from sensors and power equipment, and can issue control commands, such as tripping circuit breakers if they sense voltage, current, or frequency anomalies, or raise/lower voltage levels in order to maintain the desired level. Known types of IEDs include protective relaying devices, load tap changer controllers, circuit breaker controllers, capacitor bank switches, recloser controllers, voltage regulators, etc. These IEDs can be advantageous because, with the available microprocessor technology a single unit can perform several protection, metering, monitoring and control functions concurrently.

Substation Automation can be an important and complex aspect for maintenance and control of different equipments involved in different processes within the substation. For this purpose the substation communication network can be categorized into three layers such as process bus, bay bus, station bus. Equipments like the transformers, Merging Unit, circuit breakers, isolators and switches reside in the substation switch yard. These devices are connected through the process bus where the control commands, digitized voltage/current information, etc, flow across various layers of the substation communication architecture. The secondary devices are the intelligent electronic devices performing the protection, control, metering and monitoring functionalities by communicating with the primary equipments and hosted by the bay bus. The station bus connects the operator workstation, engineering workstation, etc, of the substation automation system to the rest of the substation elements, which communicate over the process and bay bus.

The IEDs in various layers of the substation communication network can use different communication profiles for communicating their data. Multiple protocols exist for Substation Automation, which include many proprietary protocols with custom communication links. However, interoperation of devices from different vendors can be highly desired for simplicity in implementation and use of Substation Automation devices.

The IEC61850 standard from International Electrotechnical Commission (IEC) is a standard for communication networks and systems in substation, which advocates interoperability amongst Intelligent Electronic Devices (IEDs) from various manufacturers using common engineering models, data formats and communication protocol. Recent IEDs are designed to support the IEC61850 standard for substation automation by implementing the IEC61850 profiles as per the application requirements, thereby providing interoperability and advanced communications capabilities and these IEDs are termed as IEC61850 compliant IEDs. Hereinafter the term IED should be interpreted as IEC61850 compliant IED unless specified otherwise.

The IEC 61850 standard promotes the Merging Unit (MU) which provides the standard digital interface to both conventional and non-conventional instrument transformers. The MU communicates the digitized voltage/current information using the IEC 61850-9-2 profile across the substation communication network. The IEDs in the bay performs its function by utilizing the IEC 61850-9-2 data from MU and coordinating with the other IEDs in the substation automation system. Such communications between IEDs involve the status update, executing commands based on the status of IED group, etc., and are based on the GOOSE (Generic Object Oriented Substation Event) message format defined by the IEC 61850. The substation operator can monitor and control the substation automation system from their operator workstation terminal by communicating with the IEDs in the communication network through the MMS (Manufactures Message Specifications) profile. Since the operator workstation and/or the engineering workstation are located in the control center which is a central point receiving the information from multiple bays, data acquisition from various IEDs are session based, and monitoring is less time critical, the TCP/IP based MMS profile can be preferred in such conditions.

The MMS stack is a heavy weight stack as it supports various control blocks like report, log, etc., and the MMS traffic along with the sampled measured value traffic in the process bus would cause system reliability issues. Moreover the MMS clients can obtain desired information of the system from the bay level IEDs supporting MMS stack for supervisory and control purpose, which encourages implementation using the GOOSE profile rather than the MMS stack in process bus IEDs. It is to be noted that many standard features in IEC 61850 are defined and supported for IEDs communicating over the bay bus and not much for applications over the process bus.

Exemplary embodiments as described herein can enable and coordinate mission or/and time critical functions for the IEDs that communicate using GOOSE messages over the process bus.

SUMMARY

A method is disclosed for transfer of control between a first device and a second device wherein the first and the second devices are from a group of at least two devices connected in a substation communication network and where each of the devices connected in the substation communication are involved in at least one function in a substation system, the method comprising: pre-configuring one or more data models with one or more logical nodes containing one or more data objects in the first device for transfer of control; identifying an event involving transfer of control from the first device in the substation system; exchanging, between the first device and the second device, at least one message communication that uses at least one pre-configured data model, the at least one message communication being initiated based on the event identified in the substation system; and relieving the first device from the at least one function by having coordinated transfer of control based on interaction of the at least one message with the first device.

A device is also disclosed which is configured for transfer of control, comprising: at least one processor and an associated non-transitory memory for storing one or more data models with one or more logical nodes containing one or more data objects for enabling one or more of functions from a group of functions which includes transfer of control, logical isolation or/and load sharing into or out of the device via a device connection.

BRIEF DESCRIPTION OF THE DRAWINGS

The appended drawings illustrate exemplary embodiments as disclosed herein, and are not to be considered limiting in scope. In the drawings.

DETAILED DESCRIPTION

An exemplary method is disclosed for coordinated transfer of control in a substation system comprising IEDs or logical devices/servers using GOOSE messages with pre-configured data models with logical nodes containing one or more data objects including private data objects (DO) connected in the substation communication network. The method for transfer of control can be used for hot-standby device management and for other applications such as logical isolation of a merging unit in a substation and load sharing between IEDs. The method can also be used for devices that do not have an MMS stack.

In cases of hot-standby, exemplary solutions addressed herein can make the MMS client configuration simpler by enclosing the hot-standby logical devices/servers in a single IED, and also the network IEC 61850 configuration parameters can be the same for both hot and standby logical devices/servers. So the MMS client will see this pair as a single IED, and connect with a hot logical node by enabling the TCP/IP stack of only the 'current hot' logical device.

The solution means being a GOOSE message with private DOs, the hot-standby switchover on demand can be enabled within milliseconds compared to known enabling standby based on failure of receiving an operational GOOSE message, preconfigured for a certain number of retransmission cycles (where the delay can be, for example, seconds). The coordination message will make each node in the hot-standby logical node pair aware of each other's state, thereby solving exemplary hot-standby scenarios like the failed hot IED recovering from failure and interfering with the functioning IED. A third IED with a GOOSE stack can also be used for supervising the hot-standby pair IED through this coordination of messages.

In general terms, a hot-standby use case and other uses cases for logical isolation and load sharing can involve transfer of control (relieving of control) to another device (the another device can be any other substation automation device in the substation communication network). The method for transfer of control can be between a first device and a second device, wherein the first and the second devices are from a group of at least two devices connected in the substation communication network and where each of the devices connected in the substation communication are involved in at least one function in a substation system. The method can comprise:

a. Having one or more data models with one or more logical nodes containing one or more data objects pre-configured in the first device for transfer of control;

b. Having an event involving (e.g., requiring) transfer of control from the first device identified in the substation system;

c. Having the first device and the second device exchange at least one message communication that uses one or more pre-configured data models, the at least one message communication being initiated based on the event recognized (i.e., identified) in the substation system; and d. Relieving the first device from the at least one function by having coordinated transfer of control based on the at least one message interactions with the first device.

The message communication between the first and the second devices can include instructions, device state information, substation state data, substation equipment data and acknowledgments as relevant for a given use case function.

An exemplary embodiment will be described with reference to a Hot-Standby redundancy mechanism to illustrate an exemplary method's ability to enable and coordinate mission and time critical functions for the IEDs that communicate using GOOSE messages over a process bus. Other scenarios such as a load sharing mechanism between IEDs is described as an example of mission critical function as an exemplary embodiment, and an example from a simulation/testing scenario is briefly described to illustrate applicability of exemplary embodiments for general applications.

IED Setup in Substation System

The IEDs in each bay perform different functions and coordinate between them by communicating various data for reliable Substation Automation (SA) system functioning. The current practice in the SAS to increase the reliability of the system is deploying redundant IEDs in various levels. The redundancy concepts have evolved by implementing different types of redundancy mechanisms like physical redundancy by deploying more than one IED with the same functional principle, functional redundancy by deploying IEDs with different functional principles, communication redundancy by installing redundant communication paths between IEDs, etc. An exemplary way of invoking the standby IED in the hot-standby pair is by triggering the hardwired status signal during an event such as an exception scenario. For example the watchdog timer triggering the status signal when the hot IEDs is trapped into an exception. This way the time taken for the hot-standby switchover is much less, but the various status information of hot and standby IEDs are not available within each other, which could be useful for optimally handling of scenarios like the failed hot becoming hot again after sometime by the time the standby is performing the hot role, etc.

Substation Automation Systems can be designed such that single point of failure will not cause failure of the entire system. Communication redundancy (e.g., mode of communication, communication protocols, etc.), source level redundancy (e.g., backup power supply, battery backup, etc.) and physical redundancy (for devices and accessories) are present practices to increase the operation availability and deal with single point of failures.

Physical device redundancy can be achieved in two ways. One way is deploying both the main IED and the backup IED (each with different control block reference, dataset reference, etc.), which can publish the data on to the same communication network, but this way can involve larger bandwidth for the communication network. For example, both the main and backup merging units publish messages on the same communication bus, involving increased bandwidth for the communication bus.

A second way to achieve physical device redundancy is by deploying the main IED and backup IEDs, each with different control block reference, dataset reference, etc., in the substation network, but each on a different bus. This way in turn involves more communication network accessories involving additional switches, buses/cables, etc., to route the traffic from above the main IED and backup IEDs, where both IEDs are publishers. This way of achieving physical redundancy can involve substantial network infrastructure that can result in high cost solution.

In the above mentioned ways of achieving physical redundancy, the subscribing IED should be capable of handling an increased amount of data traffic from main and backup IEDs. This can pose stringent design specifications resulting in high cost of the IEDs. For example, the main Merging Unit and the backup Merging Unit publishing the data could double the network bandwidth, or otherwise involve dual buses, but in any case the protection relay receiving the SMV (Sampled and Measured Value) data must handle the huge amount of data in relatively less time.

In yet another way, an IED referred to herein as the "hot" IED is provided along with a backup (standby) IED. The backup IED monitors the hot IED, assessing if the hot IED is functioning normally (without fault) and does not participate in any external visible operation (silent observer). The backup IED takes over the functionality of the hot IED in an event where the hot IED is unable to provide a desired service. A coordinated Hot & Standby IED concept allows use of one or more IEDs with hardly any increase in design consideration. Exemplary embodiments described herein can include a means to achieve such a coordinated concept using GOOSE messages with Private Data Objects (DO).

The use of a Data Object (DO) for triggering actions in IEC 61850 is a known concept (e.g., OpCls in CSWI to trigger a closing operation in XSWI), but exemplary embodiments disclosed herein can additionally address the fact that the GOOSE input is preconfigured to the IED to perform the function as designed for the specific application.

More recent IEDs have good computational power and perform various functions including the task of communicating within the system. While IEDs can face few exceptions, but still communicate, the 'hot-standby' switch over is possible with communications between IEDs. In this method, the IEDs in the hot-standby pair exchange the messages for both switching over the role as well as exchanging various status messages detailing the state of each IED in the hot-standby pair at any moment. This can involve communication and message processing overhead compared to known ways of triggering the hot-standby systems, but serves better where hot-standby switch over time can be slightly higher without affecting the system performance. This method can be well suited in a scenario where the standby IED is invoked by the detection of operational message failure because this method performs hot-standby switch over much earlier before detecting the failure of operational message.

An exemplary issue that is considered herein for providing a solution is that the engineering and configuration of the SCADA system or the client in the substation automation system should not become too complicated. So the client should see the hot-standby arrangement as a single physical device and at any point in time the communication should be between the hot IED and the client system. The communication frame should not distinguish whether the message is from the hot or stand by IED. The IED identity for the hot and standby IED should be the identical. The activity of the functionality switch over between hot and standby IEDs should be confined locally by transacting the above GOOSE messages between them. This may be achieved by a variety of means and only a few exemplary embodiments are described herein with reference to the Figures for a hot-standby setup.

Figure 1:
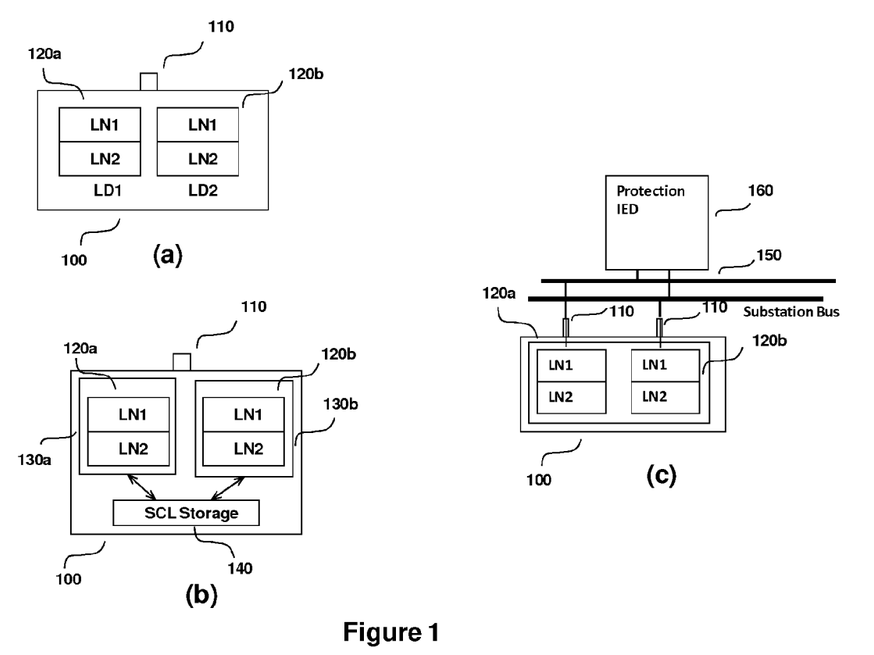
FIG. 1 shows exemplary arrangements to have hot and standby devices in a single physical device.

FIG. 1 illustrates an arrangement with a single physical device 100 having one or more Ethernet connections 110 for connectivity, but configured to have two logical devices (120a and 120b) implemented, for example, as separate software modules on a CPU (i.e., processor) with appropriate memory, where the two logical devices are functionally identical for purposes of specified functions as described herein. The device 100 is said to be pre-configured for transfer of control for the hot-standby application. It is to be noted that the device 100 may also exist as having only one logical device (120) for enabling other applications (e.g., logical isolation). Pre-configuration can include having one or more data models with one or more logical nodes containing one or more data objects for addressing at least one device deployed in the substation system and connected in the substation bus.

The logical devices may be implemented on a hypervisor so that these are running on two different virtual platforms sharing the common Ethernet connectivity (FIG. 1(a)). The two logical devices communicate with each other through GOOSE for coordinated role change as HOT or Standby. Each of the logical devices may have one or more logical nodes (LN) defined as desired for the function configured in it. The one or more logical nodes may be mandatory or private or any other logical node created under one or more logical devices and the one or more data objects may be private or any other data object created under one or more logical nodes.

In another exemplary embodiment (FIG. 1(b)), the logical devices (120) have a separate CPU for each logical device and are placed in a single enclosure so that the client sees a single physical device. The logical devices, here are shown to have their own Ethernet port for connectivity. In yet another embodiment (FIG. 1(b)), the logical devices (120) are the servers and share a common Flash System for SCL (Substation Configuration Language) files such as SCD (Substation Configuration Description), ICD (IED Capability Description) files. The hot and standby servers are placed in a single enclosure. In yet another exemplary embodiment, the logical devices (120) can be running on two different cores in a multi-core virtualization arrangement depicted in FIG. 1(c). The device 100 is also shown as connected to the substation communication network 150 depicted as a substation bus having other substation devices 160 (including IEDs, relays etc) connected to the substation bus.

Figure 2:
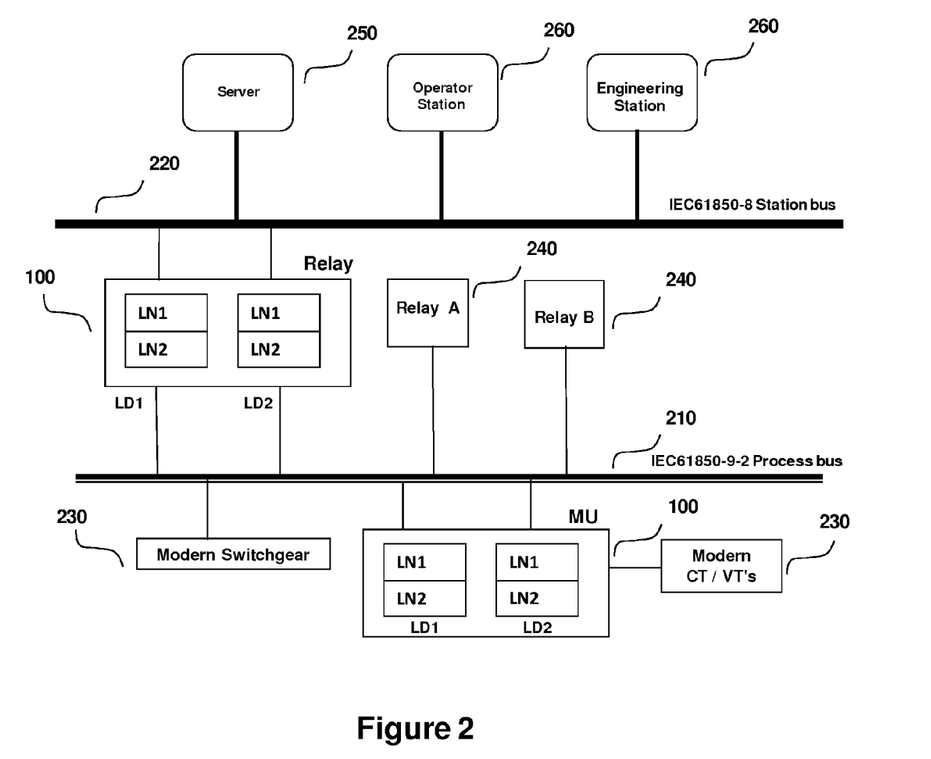
FIG. 2 shows deployment of exemplary hot and standby devices in a substation system.

FIG. 2 depicts the substation system having the device 100 connected in the process bus 210 and another device 100 connected to the process bus 210 and the station bus 220. The communication network (substation bus) 210 and 220 have other devices (primary electrical equipment 230, primary devices 100, 240, servers 250 and clients 260) connected in the substation bus.

The SCADA (Supervisory Control and Data Acquistion)/client configuration can be simple because it sees a single IED wherein hot-standby switch over happens internally. This method of functionality take-over/handover can be used during non-time-critical scenarios such as the hot IED has found some exceptions like battery low, RTC (Real Time Clock) failure, RAM (Random Access Memory) corruption, etc., but still it can communicate with the Standby IED.

In an exemplary communication network, there are numerous IEDs in the same multicast group. The GOOSE message specific for a hot-standby functionality transacted between hot and standby Server/Logical Device can be restricted from other hot-standby pair IEDs. Similarly the IED that publishes the operational GOOSE message to a hot-standby pair IED should see them as a single IED and the GOOSE message should reach the hot-standby IED irrespective of which Server/Logical Device is hot. This problem can be addressed by defining a unique identifier for each Server/Logical Device in the hot-standby pair IED data model and pre-configuring the GOOSE module to process the incoming GOOSE message based on this unique identifier. Also the GOOSE control block reference, dataset reference, application id, GOOSE id in a GOOSE message generated by any server in the hot-standby pair can be the same except the source MAC address. Thus, the subscribing IED in the multicast group will have no problem in receiving the operational GOOSE messages from the hot-standby IED.

The hot-standby functionality switchover may be configured to happen without exchanging any GOOSE message, but just listening to the operational GOOSE messages and detecting the hot IED's failure if a desired GOOSE message is not received for specified amount of time (for example, one second for an IED with one second background cycle or any other suitable frame). Additionally, the hot-standby switchover may happen within for example, a millisecond in case of hot-standby switchover on demand. Also, the failed hot logical device/server does not interfere with the functioning standby logical device upon coming out of failure by switching over the functionality only when the current logical device/server (either hot or standby) is facing some exceptions. This is achieved by storing (e.g., in local or remote memory) the state, health information of hot and standby logical devices/servers and exchanging them between hot and standby logical devices. As a further addition, if desired, a third IED with GOOSE stack can be made to act as a supervisory IED and control the switchover process based on the above supervisory messages originated by both hot and standby logical devices/servers.

In another exemplary embodiment, the hot-standby IED combinations may be used also for load sharing use cases/applications with the help of coordinated communication as utilized for the hot-standby switch overs. This is possible as IEDs are designed in a way that a single IED can perform more than one function leading to easy configuration and maintenance, and efficient data handling in the network due to the computational power that is available with the IED. Moreover, such enormous power can be available at low cost, therefore enhancing the IEDs for load sharing applications.

In an event of an IED (Hot) being computationally overloaded, for example a protective relay is busy in identifying the fault scenario and an issue of trip command, and this relay is also configured to perform fault waveform recording simultaneously, the another IED in the network that is configured as the standby IED for at least one function of the Hot IED, in this case, recording the fault waveform, the Hot IED may transfer the functionality of waveform recording to the standby IED to achieve relief from the overload condition. This application of load sharing can be enabled through exchange of a GOOSE message with a private data object in a manner similar to Hot-Standby switch overs.

In yet another exemplary embodiment, the GOOSE message with private data objects can be used for logical isolation functions particularly for the IEDs for example a Merging Unit IED that has only GOOSE stack and not the MMS stack. This feature can be used for simulation and testing applications, where, a particular IED (example Merging Unit) is to be isolated, and another device or server may perform testing or simulation in the substation system having the IED (Merging Unit) in an isolated condition. In addition to the testing and simulation applications, a logical isolation technique may be used to isolate a faulty IED during substation automation maintenance or otherwise during operation of the substation (if the IED is able to publish and subscribe the data).

GOOSE Communication between IEDs

The exchange of a GOOSE message with private data objects can be used for functionality handover and state information sharing. The general steps along with a specific example for a Hot-Standby use case is described herein.

The method involves new private data objects for example 'FncHndOvr' (Functionality Handover), 'HotStandbySprvsn' (Hot standby supervision) being defined and assigned to the IEC 61850 common data class, say for example INC. The data objects further have enumerated attributes to send various commands. For example, the data object 'FncHndOvr' is defined to further have enumerated attributes such as 'Take over the functionality', 'Give up the functionality', 'Share the load', 'Give back the load', 'none', etc. to send various commands. The data object 'HotStandbySprvsn' is further defined to have enumerated attribute to send various status information like 'Default hot—Now hot', 'Default hot—Now standby', 'Default Standby—Now Hot', 'Default Standby—Now Standby', 'Default Hot—Now in load sharing mode', 'Default Standby—Now in load sharing mode', etc. The IEDs in the hot-standby pair should have the unique identifier for identifying the GOOSE message carrying command for functionality handover and state of the IED from only its hot-standby pair. For this purpose, the data model of the Server/Logical Device is pre-set in the hot-standby pair with the data object for example 'HotStandbyId' (Hot standby identifier) containing a unique identifier of the Server/Logical Device. This is done in the firmware stage, using a configuration file or as per user settings. This information is used by the IED initially to understand which logical device is hot and which is standby. This data object is assignable to the IEC 61850 common data class, example INC (Integer Control), and is instantiated under any mandatory logical node, example LPHD (Logical node for PHysical Device information).

A dedicated GOOSE control block with dataset containing the data objects 'FncHndOvr', 'HotStandbySprvsn', 'HotStandbyId' is defined in the IED and the configuration file. A specification for this method is that the IED identity like GOOSE control block, dataset references should be same for both the hot and standby Servers/Logical Devices.

Both the hot and the standby Server/Logical Device can subscribe to the GOOSE messages from each other. There could be two types of GOOSE message that can be transacted between them. One is the operational data containing status of various inputs. The other message is the supervisory message containing the state of the Server/Logical Devices indicating whether it is at present hot or standby along with commands for hot-standby and/or load sharing functionality. The supervisory GOOSE message shall carry the private data objects for example 'FncHndOvr', 'HotStandbySprVsn' with an enumerated data attribute as described earlier.

Sequence of Operation

The device monitoring the other for its correctness of operation at startup publishes the message to the communication network containing data objects representing the action for hot-standby switchover, device state identification and device identification with their enumerated data attributes carrying the default values.

For example, in the hot-standby use case, The Server/Logical Device (either hot or standby) monitoring the other for its correctness of operation can at startup publish the GOOSE message to the communication network containing 'FncHndOvr', 'HotStandbySprvsn', 'HotStandbyId' data objects specifically the data attribute of 'FncHndOvr' value being 'none'.

The device, upon detection of an exception in the other, publishes the message to the communication network containing data objects representing the action for hot-standby switchover, device state identification and device identification with an appropriate value of their enumerated data attribute.

For example, in the hot-standby use case, The Server/Logical Device (either hot or standby) monitoring the other for its correctness of operation upon detection of an exception can publish the GOOSE message to the communication network containing 'FncHndOvr', 'HotStandbySprvsn', 'HotStandbyId' data objects specifically the data attribute value of 'FncHndOvr' being 'Give up the functionality', the DO 'HotStandbySprvsn' reflecting the current state, the DO 'HotStandbyId' being the unique identifier of the receiving Server/Logical Device in the hot-standby pair.

The device receiving the message with the enumerated data attribute value of device identification data object as its own identity understands the start of functionality take over/load sharing scenario and reacts based on the enumerated data attribute's value of the hot-standby switchover data object.

For example, in the hot-standby use case, the subscribing Server/Logical Device when the GOOSE message with its own identity is received understands that the start of functionality take over/load sharing scenario. Further decoding the DO 'HotStandbyId' for matching with receiving Server/Logical Device logical address/identifier and the data attribute value of 'FncHndOvr' for the above said command and reacting to that command, the functioning Server/Logical Device transitions to a quarantine state without needing a physical disconnection and the hot/standby Server/Logical Device which identified an exception in the other will take over the role.

When the receiving device changes its state from hot to standby, it generates a message containing the data objects representing the action for hot-standby switchover, device state identification and device identification with their enumerated data attributes carrying its current state and receiving device's device identifier.

For example, in the hot-standby use case, When the receiving Server/Logical Device changes its state from hot to standby, it generates the GOOSE message containing the DO 'HotStandbySprvsn' with data attribute value 'Default Hot—Now Standby', DO 'FncHndOvr' with data attribute value 'none', DO 'HotStandbyId' with a data attribute value indicating the receiving IED's logical identifier.

The standby device, which is hot now upon reception of the message from the current standby device, changes its data object's enumerated data attribute value to reflect its current state and restarts the message transmission.

For example, in the hot-standby use case, The standby Server/Logical Device which is hot now upon reception of GOOSE message from the current standby Server/Logical Device, changes its 'HotStandbySprvsn' data object's attribute value to 'Default Standby—Now Hot' and restarts the GOOSE sequence.

It is to be noted that the transfer of control between the hot and the standby devices may be managed with help of a third device wherein the third device recognizes the event desiring the transfer of control and also coordinates with the hot device and the standby device in the substation system and such management may have the hot device and the standby device of one another.

Figure 3:
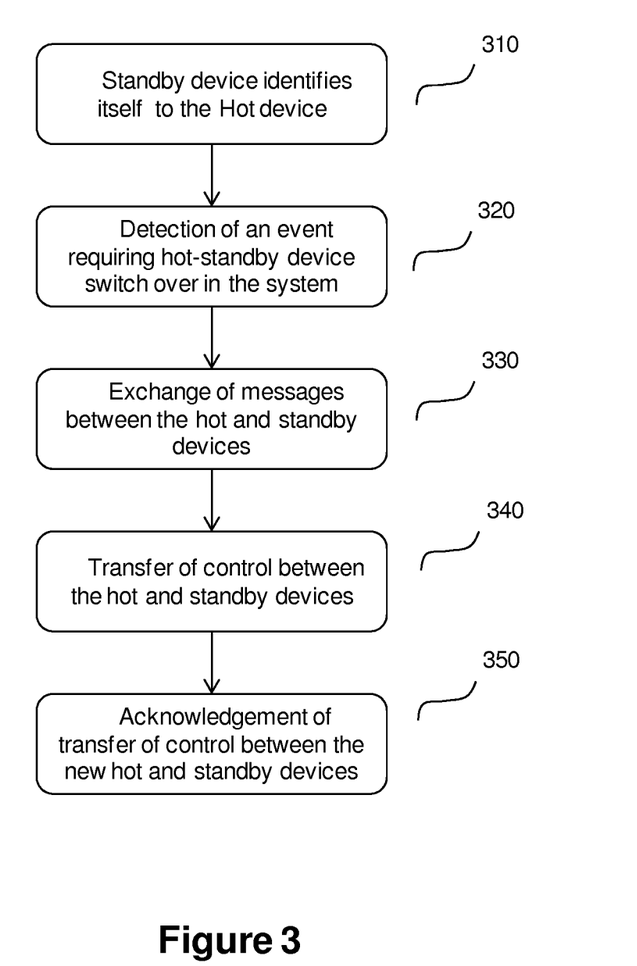
FIG. 3 shows an exemplary method for transfer of control between a hot device and a standby device.

As one exemplary embodiment, steps involved in the transfer of control between the hot and the standby devices are illustrated with FIG. 3 and summarized below:

(a) Step 310: The standby device identifies itself in the substation communication network by publishing GOOSE message and this communication is received by the Hot device;

(b) Step 320: The event involving transfer of control is detected by the hot device or the standby device or any other device in the substation system to initiate transfer of control between the hot and standby devices;

(c) Step 330: The event triggers exchange of GOOSE messages between the hot and standby devices that includes exchange of state information and other information to claim control by the standby device;

(d) Step 340: The hot device transfers the control to the standby device; and (e) Step 350: The standby device becomes the new (current) hot device and acknowledges being the new (current) hot device to the previously hot device (new standby device).

Communication with MMS Client during Hot-Standby Switchover

The MMS client will initially establish a TCP/IP session with the hot IED (MMS client sees the hot-standby IEDs as a single IED) through which various transactions between the SCADA system and the IED are made. When the functionality switch over happens from a hot to a standby logical device/server, then the TCP/IP session between the 'default hot' logical device/server and MMS client breaks. This can be addressed by enabling the TCP/IP stack of the standby logical device/server only when the functionality handover scenario starts; until then the standby logical device/server runs the modules, which doesn't require TCP/IP stack, for example GOOSE. In an exemplary embodiment, the network parameters for both hot and standby logical devices/servers should be same and the 'default hot' logical device/server should disable the TCP/IP stack when it hands over the functionality. The MMS client in this case will not be aware of this hot-standby functionality handover between hot and standby logical devices/servers. So a break in the TCP/IP session due to hot-standby switchover will be known to the MMS client when it receives the error response for its send/receive requests. Since the MMS client will try to reconnect with the server again with the same authentication credentials that it has with it and by the time the 'default standby' logical device/server would be running with same authentication credentials of the 'default hot' logical device/server, a new TCP/IP session will be established between MMS client and 'current hot-default standby' logical device/server without MMS client realizing the hot-standby switchover.

An IED implementing MMS stack can also be programmed for a hot-standby use case by having the IED receive a command from an MMS client to switch from hot to standby or vice versa. The type of functional constraint for the data attributes of 'FncHndOvr' data object needs ST (Status) and also desirably CO (control) for transacting a message between client and server. The GOOSE control block is configured such that the IED upon receiving the switch over command should generate the GOOSE message as described in earlier paragraphs.

Figure 4:
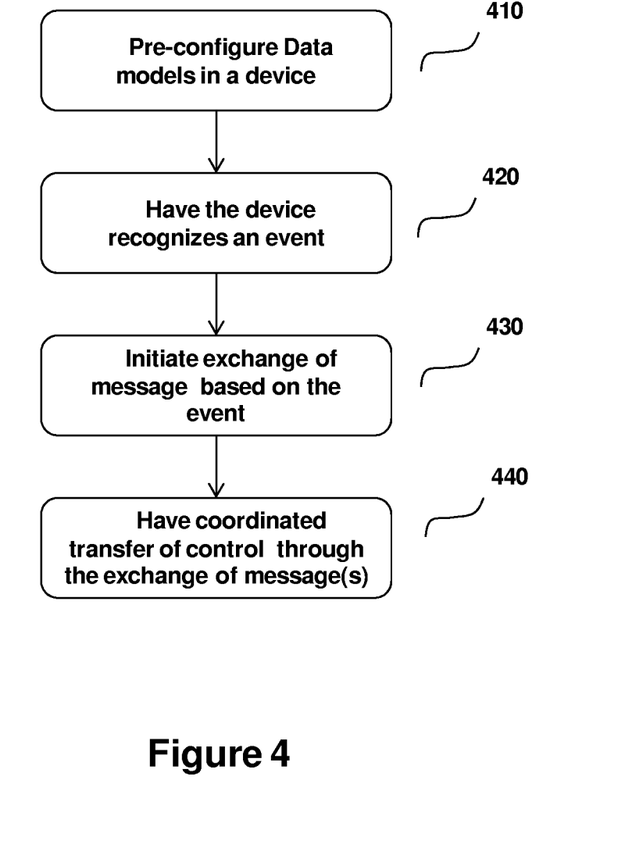
FIG. 4 shows an exemplary method for coordinated transfer of control between two devices.

The method for transfer of control is generalized and summarized as illustrated in FIG. 4 and given below:
(a) Step 410; A first device 120 in the substation communication network (210, 220) is pre-configured having one or more data models with one or more logical nodes containing one or more data objects including at least one private data object for transfer of control to a second device in the substation communication network;
(b) Step 420; The first device is also pre-configured to identify an event or respond to the second device in the substation communication network that has identified an event requiring transfer of control wherein the event includes simply a request generated by any other pre-configured device (including a server or client) in the substation system;
(c) Step 430; On recognition of the event, the first device or the second device initiates GOOSE message communication in the substation communication network that utilizes the one or more data models pre-configured in the first device; and
(d) Step 440; The first device has a coordinated transfer of control using one or more GOOSE messages exchanged between the first and second devices.

It is to be noted that the method is described herein can use IEC 61850 standard communication protocols and data models and GOOSE messages, but the method is also applicable to any other standard or propriatory communication methods used in automation systems (including process automation for field devices in the field bus using Fieldbus communication standards).

The various embodiments described herein are for a variety of applications and are designed using exchange of GOOSE messages with private data objects. It is to be noted that GOOSE is an exemplary protocol/profile used to explain an exemplary embodiment. Any other protocol irrespective of the communication medium (wired or wireless) can also be used that has a means to communicate periodically the process data or field data or any status data related to the devices in the system. The communication may happen with or with acknowledgements involved in the steps of coordinated transfer of control. Further the data model is any information model and is not restricted to the IEC 61850 data model and the logical nodes are any functions related to the application system or use and are not restricted to IEC 61850 logical nodes. In the same lines, the private data object referred to herein is any data type that is capable of storing or handling information and is not restricted to IEC 61850 private data object.

Various other modifications and alterations in the structure and method of operation described herein will be apparent to those skilled in the art. Although the invention has been described in connection with specific preferred embodiments and specifically for applications using IEDs in a substation system it should be understood that the invention as claimed should not be unduly limited to such specific embodiments or to substation systems.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for transfer of control between a first device in a substation system and a second device in the substation system, wherein the first and the second devices are from a group of at least two devices connected in a substation communication network, and wherein each device of the group of at least two devices connected in the substation communication network is involved in at least one function in the substation system, the method comprising:
pre-configuring, during engineering of the substation system, one or more data models with one or more logical nodes containing one or more data objects in the first device for a transfer of control, by defining a Generic Object Oriented Substation Event (GOOSE) control block in a configuration file of the first device;
identifying an event in the substation system involving the transfer of control of the at least one function of the first device to the second device;
exchanging, between the first device and the second device, at least one GOOSE message communication over the substation communication network based on the event identified in the substation system, wherein the at least one GOOSE message communication includes at least one data object of the one or more data objects pre-configured during the engineering of the substation system, wherein the at least one data object includes a command associated with at least one of logical isolation, hot-standby and load sharing functionality; and
relieving the first device from the at least one function of the first device through the second device based on exchange of the at least one GOOSE message communication between the first device and the second device.

2. The method of claim 1, wherein the devices connected through the substation network comprise:
at least one of an: IED, Merging Unit, Server or Client in the substation system, and/or logical or virtualized versions of these devices or any part of these devices.

3. The method of claim 1, wherein the event identified in the substation system is an event that occurs due to an exception condition with any device in the substation system.

4. The method of claim 1, wherein a coordinated transfer of control based on the at least one message communication using one or more data models is for transfer of control between a Hot device and a Standby device.

5. The method of claim 4, wherein the coordinated transfer of control based on the message communication for transfer of control between a Hot device and a Standby device comprises:
the hot or/and Standby device identifying itself by publishing at least one message communication in the substation communication network; and/or
the hot or/and standby device publishing at least one message communication as an acknowledgement for transfer of control between the hot and standby devices.

6. The method of claim 1, wherein a coordinated transfer of control based on the at least one message communication is for transfer of control of at least one functionality from the first device.

7. The method of claim 1, wherein the first device is a merging unit and the second device is a testing device, and wherein a coordinated transfer of control based on the at least one message communication is for transfer of control between the merging unit and the testing device in the substation system for simulation, or testing of the merging unit or of the substation system.

8. The method of claim 1, wherein a coordinated transfer of control is from the first device to an another device in the group of at least two devices and the said another device is different from the second device in the substation system; and wherein the relieving the first device from the at least one function by coordinated transfer of control is managed through the second device.

9. The method of claim 1, wherein the event is a result of one or more MMS or GOOSE message requests for any device in the substation system.

10. The method of claim 1, wherein the first device and the second device are enclosed as hot-standby logical devices in a single IED, and network IEC 61850 configuration parameters are identical for both the hot and standby logical devices.

11. The method of claim 1, wherein the first and the second device are logical devices in a single IED, wherein the single IED is connected in the substation communication network, and wherein the logical devices communicate with each other through GOOSE in the substation communication network for coordinated role change as hot or standby.

12. A system comprising:
a group of devices connected in a substation communication network, each device connected in the substation communication network being involved in at least one function of a substation system, the group of devices including:
at least a first device and a second device,
wherein the first device is pre-configured during engineering of the substation system to have one or more data models with one or more logical nodes containing one or more data objects for transfer of control of the at least one function of the first device to the second device by defining a Generic Object Oriented Substation Event (GOOSE) control block in a configuration file of the first device,
wherein the first device and the second device are pre-configured to exchange at least one GOOSE message communication over the substation communication network, the at least one GOOSE message communication being initiated based on an event requiring the transfer of control of the at least one function of the first device to the second device in the substation system, wherein the at least one GOOSE message communication comprises at least one data object of the one or more data objects pre-configured during the engineering of the substation system, wherein the at least one data object includes a command associated with the at least one of logical isolation, hot-standby and load sharing functionality; and
wherein the second device is pre-configured to relieve the first device from the at least one function based on the exchange of the at least one GOOSE message communication with the first device.

13. The system of claim 12, wherein at least one of the devices has a GOOSE stack or/and MMS stack or wherein the group of devices is configured for transfer of control, each device having one or more data models with one or more logical nodes containing one or more data objects created to enable one or more functions from the group of functions consisting of: logical isolation and load sharing.

14. The system of claim 12, configured for providing a GOOSE message communication.

15. The system of claim 12, in combination with a substation communication network that is a substation process bus.

16. The system of claim 12, wherein the one or more data models is defined using an IEC 61850 standard.

17. The system of claim 12, wherein the one or more logical nodes comprises:
a mandatory, and/or private logical node created under one or more logical devices.

18. The system of claim 12, wherein the one or more data objects comprises:
a mandatory and/or private data object created under one or more logical nodes.

* * * * *